United States Patent
Chen et al.

(10) Patent No.: US 10,027,144 B2
(45) Date of Patent: Jul. 17, 2018

(54) LIFTABLE CHARGING APPARATUS WITH WATER LEVEL DETECTION

(71) Applicant: PHIHONG TECHNOLOGY CO., LTD., Taoyuan (TW)

(72) Inventors: Chun-Chen Chen, Taoyuan (TW); Jian-Hsieng Lee, Tainan (TW); Hsiao-Tung Ku, Taoyuan (TW)

(73) Assignee: PHIHONG TECHNOLOGY CO., LTD., Taoyuan (TW)

( * ) Notice: Subject to any disclaimer, the term of this patent is extended or adjusted under 35 U.S.C. 154(b) by 134 days.

(21) Appl. No.: 15/259,050

(22) Filed: Sep. 8, 2016

(65) Prior Publication Data
US 2017/0366024 A1   Dec. 21, 2017

(30) Foreign Application Priority Data
Jun. 21, 2016   (TW) .............................. 105119468 A

(51) Int. Cl.
*H02J 7/00* (2006.01)
*G01F 23/26* (2006.01)
*G01F 23/296* (2006.01)

(52) U.S. Cl.
CPC .......... *H02J 7/0029* (2013.01); *G01F 23/263* (2013.01); *G01F 23/296* (2013.01); *H02J 7/0045* (2013.01); *H02J 7/0047* (2013.01); *H02J 2007/0037* (2013.01)

(58) Field of Classification Search
CPC ....... Y02E 60/12; H02J 7/0042; H02J 7/0045; H01M 10/46; H01M 10/44
USPC .......................................................... 320/107
See application file for complete search history.

(56) References Cited

U.S. PATENT DOCUMENTS

| | | | | |
|---|---|---|---|---|
| 3,941,507 A | * | 3/1976 | Niedermeyer ........ | F04B 49/025 320/137 |
| 5,898,374 A | * | 4/1999 | Schepka ............... | G01F 23/243 250/255 |
| 6,096,178 A | * | 8/2000 | Amirav .................. | G01N 30/68 204/274 |
| 2012/0275927 A1 | * | 11/2012 | Rhim ...................... | F04B 23/02 417/36 |
| 2016/0349094 A1 | * | 12/2016 | Dietrich ................. | G01F 23/26 |

* cited by examiner

*Primary Examiner* — Arun Williams
(74) *Attorney, Agent, or Firm* — Chih Feng Yeh; Huntington IP Consulting Co., Ltd.

(57) ABSTRACT

The present invention provides a liftable charging apparatus with water level detection. The liftable charging apparatus comprises a control module, a power module, a detective module, an overvoltage protection module and a lifting module. The power module, coupled to the control module, comprises an AC/DC converting unit for converting AC current into DC current. The detective module, coupled to the control module, comprises a water level detection unit and a micro-switch. The water level detection unit is provided to detect a height of outside water level. The overvoltage protection module is coupled to the power module and the detective module. The lifting module is coupled to the control module. Wherein the overvoltage protection module is triggered by the micro-switch and the lifting module is driven when the height of outside water level is greater than a default value.

20 Claims, 2 Drawing Sheets

LIFTABLE CHARGING APPARATUS WITH WATER LEVEL DETECTION

CROSS REFERENCE TO RELATED APPLICATIONS

This application is a Counter Part Application of TAIWAN Patent Application Ser. No. 105119468, filed on Jun. 21, 2016. The content of the above-mentioned patent applications is hereby incorporated by reference herein in its entirety and made a part of this specification.

TECHNICAL FIELD

The present invention generally relates to a charging apparatus, and more particularly, to a liftable charging apparatus with water level detection.

BACKGROUND OF RELATED ARTS

In current society, people live more conveniently attributed by industry and technology, meanwhile, living quality is gradually improved as well. However, there are large numbers of potential problems caused by industry and technology, such as ecological damage, energy crisis, source crisis and so on. Therefore, it's important to realize and start to solve the potential problems above for sustainable development of the earth. Everyone is under the obligation of energy conservation to protect earth ecology.

Take the development of public transportation as an example, bicycles and rickshaws in agricultural period were developed to motorcycles, vehicles and plans through industrial revolution to reduce the distances and times of transportation. Motorcycles and vehicles are driven by petroleum, thereby causing petroleum shortage and soaring the price of petroleum. Worse still, some irreversible problems would be generated, such as air pollutions. Therefore, it's important to develop green transportations with characteristics of low-pollution and low-energy-consumption, such as electric vehicles are common green transportations.

Rechargeable battery of electric vehicles could replace petroleum of traditional transportations to reduce pollutions. However, the rechargeable batteries have limited storage capacity, then, they should be charged regularly at stationary point. It's important and necessary an ideal charging stations system for all of drivers.

There are abundance of rain in all year in many place of the planet, it is typically caused by climate or monsoons. Especially, there is torrential rain in typhoon season from June to September in the Western Pacific Ocean. Still worse, that would cause flood and tremendous damages in flat regions. For charging system in rainy country, it musts overcome disadvantages caused by rains to avoid the charging system from being damage. In prior art, charging posts are far away the ground by filling cement below thereof, but it cannot be adapted to various environments because those heights are stationary.

In order to solve the problem of the conventional arts, the present invention provides a liftable charging apparatus with water level detection which could move up and move down in the same point when rain falling.

SUMMARY

An object of the present invention is to provide a liftable charging apparatus with water level detection. The liftable charging apparatus includes a control module, a power module, a detective module, an overvoltage protection module and a lifting module. The power module, coupled to the control module, includes an AC/DC converting unit for converting AC current into DC current. The detective module, coupled to the control module, includes a water level detection unit and a micro-switch. The water level detection unit is provided to detect a height of outside water level. The overvoltage protection module is coupled to the power module and the detective module. The lifting module is coupled to the control module. Wherein the overvoltage protection module is triggered by the micro-switch and the lifting module is driven when the height of outside water level is greater than a default value.

According to the embodiment of the present invention, the apparatus further includes a charging cable, an alert module, a button and a metering unit. The charging cable, coupled to the power module, transmits DC current to an outside electric device. The alert module, coupled to the detective module through the control module. The button is coupled to the overvoltage protection module. The metering unit is coupled to the overvoltage protection module.

According to the embodiment of the present invention, the apparatus further includes a display module, a recognition module and a communication module. The recognition module is coupled to the control module through the display module. The communication module is coupled to the detective module through the display module and the control module. The recognition module includes a radio frequency identification (RFID), the communication module includes a wireless communication unit, and the display module includes a touch screen. The display module further comprises an input unit for inputting information and instructions by users.

According to the embodiment of the present invention, the power module further includes a secondary power module, a power unit and a digital processor. The alert module includes LED indicators and buzzers. The lifting module further includes a rising unit and a falling unit. The rising unit and the falling unit may be hydraulic machinery.

According to the embodiment of the present invention, the lifting module is formed integrally with the detective module to being located between the apparatus and the ground.

BRIEF DESCRIPTION OF THE DRAWINGS

The components, characteristics and advantages of the present invention may be understood by the detailed description of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims. The layout of components may be more complicated in practice.

Figure 1:
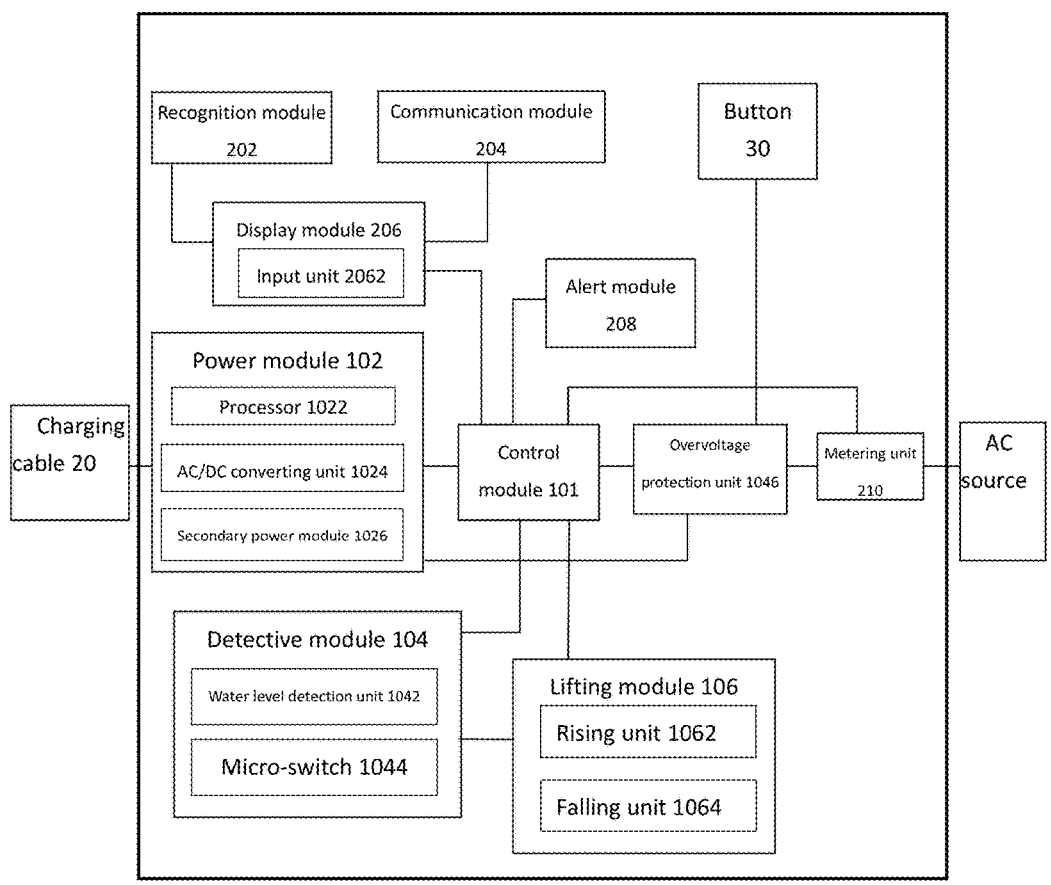
FIG. 1 illustrates a block diagram of the liftable charging apparatus with water level detection of the present invention.
Figures 2A, 2B:
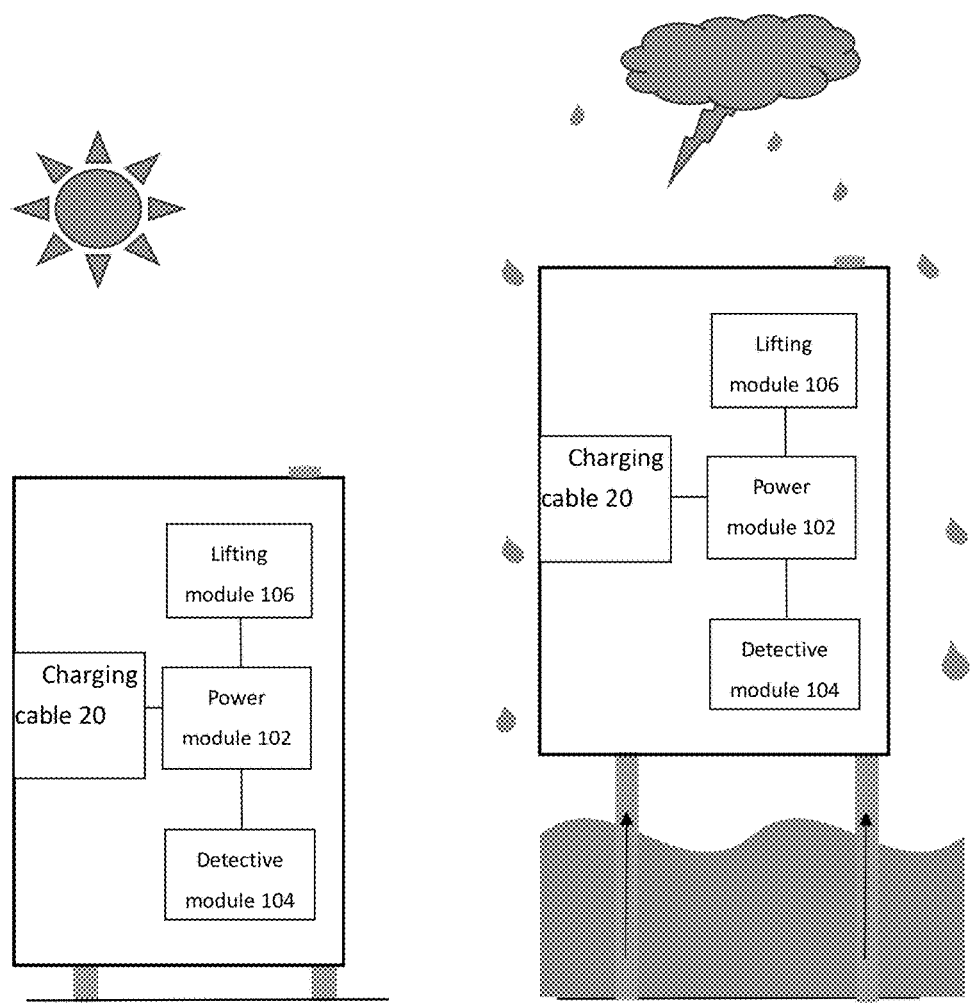
FIG. 2A illustrates a diagram of the liftable charging apparatus of the present invention.
FIG. 2B illustrates a diagram of lifting mode of the liftable charging apparatus of the present invention.

FIG. 1 shows a block diagram of liftable charging apparatus with water level detection of the present invention. The liftable charging apparatus with water level detection (hereinafter called apparatus 100) includes a power module 102, a detective module 104 and a lifting module 106. In one embodiment, the apparatus 100 can be positioned over the ground. As shown in FIG. 2A, the detective module 104 is positioned at the bottom inside the apparatus 100. And the power module 102 is coupled between the lifting module 106 and the detective module 104, as shown in FIG. 1. It should be noted that the configuration of modules and units of the text and drawings is one of examples for illustration, but not limited to the present invention. In the preferred embodiment, the apparatus 100 may be a charging post being available for electric vehicles or other chargeable device.

The apparatus 100 comprises at least one control module 101 can be as center for driving the apparatus 100. The power module 102, lifting module 106, detective module 104 and others modules and components are controlled by the control module 101. The control module 101 includes memory (not shown in figures) for storing instructions and parameters. It is well understood by the skilled person in the art that the apparatus 100 is controlled by the instructions and parameters stored in the control module 101. The control module 101 further includes other main components, fireware or software, such as logic unit (not shown in figures). Therefore, not being further illustrated hereinafter.

The power module 102 includes a processor 1022, an AC/DC converting unit 1024, a charging cable 20 and a power cable (not shown in figures). The AC/DC converting unit 1024 converts AC current, from AC source, into DC current to transmit to electric vehicle and other electric device via charging cable 20. In one embodiment, the AC/DC converting unit 1024 includes rectifier, transformer, and so on. The power module 102 further includes but not limited to power unit module, transistors, transformer, capacitor and digital signal processing (DSP), and so on. In one embodiment, the output voltage range of the power module 102 is between 200V-750V, and output power of that is up to 20 kW.

In one embodiment, the power module 102 further includes an auxiliary power module 1026 which provides power for main electric components inside the apparatus 100, such as the lifting module 106 and detective module 104, to maintain function of the apparatus 100, but not for electric vehicles outside. In the embodiment, the output voltage of the auxiliary power module 1026 is between 12V-24V, the output power of that is between 400-700 W, preferably 400 W.

In one embodiment, the apparatus 100 includes an overvoltage protection unit 1046 which is located at the bottom inside the apparatus 100. The detective module 104 includes a water level detection unit 1042 and a micro-switch 1044 to detect outside height of water level. The water level detection unit 1042 includes various water level meter, such as ultrasonic probe, submersible probe, capacitive probe, electrode probe, and so on. The overvoltage protection unit 1046 will be triggered by the micro-switch 1044 when outside height of water level, detected by the water level detection unit 1042, is higher than a default value, and the AC/DC converting unit 1024 also will be interrupted, thereby stopping charging, but remaining main power inside the apparatus 100 to maintain function. In another embodiment, the apparatus 100 further includes an alert module 208 which is coupled to the micro-switch 1044 of the detective module 104. For example, the alert module 208 includes a LED indicator or a buzzer. The overvoltage protection unit 1046 is triggered, at the same time, the alert module 208 is also triggered, so that LED indicator or buzzer will work to warn against using the apparatus 100. In another embodiment, some caution information are transmitted to the display module 206, and shown thereon.

In one embodiment, the lifting module 106, positioned at the top inside the apparatus 100, can rise all of includes inside the apparatus 100 up and away from the raising water. Furthermore, all of components inside the apparatus 100 will be back to the original position by the lifting module 106. More description, the lifting module 106 includes rising unit 1062 and a falling unit 1064. The rising unit 1062 and the falling unit 1064 may be hydraulic machine. For example, the rising unit 1062 of the lifting module 106 will be triggered to rise all of component inside the apparatus 100 up when the outside height of water level detected by the detective module 104 is higher than default value, at the same time, the detective module 104 may be risen or stay still. On the other hand, the falling unit 1064 of the lifting module 106 will be triggered to return all of component inside the apparatus 100 back when rainfall stopping and flood solved. In another embodiment, the apparatus receives the default value from remote control servers through the communication module 204.

In another embodiments, the lifting module 106 and the detective module 104 can be positioned at the bottom inside the apparatus 100. Furthermore, the lifting module 106 and the detective module 104 can be formed integrally an integral unit. Particularly, the bottom of the apparatus 100 has four supporting units being as connection between ground and apparatus 100. Each of supporting units is positioned at each corner of the apparatus 100 below, respectively. Each of supporting units may be telescopic supporter with multi-sections or multi-axis mechanical telescopic supporter. Each of supporting units has detective module 104 which could detect outside height of water level. As shown in FIG. 2B, each of supporting units extends upward away from flood, when outside height of water level is higher than the default value, the lifting module 106 is triggered to perform duty.

In one embodiment, the apparatus further includes a recognition module 202, a communication module 204 and a display module 206. The recognition module 202 and the communication module 204 are commonly coupled to the control module 101 through the display module. The display module 206 includes touching screen, located at a side of the apparatus 100, such as top surface. In the preferred embodiment, the display module 206 further comprises an input unit 2062 which is provided to input parameters, information and instructions. For example, the display module 206 may be a human-machine interface (HMI) for displaying status of the power module 102, such as storing, charging, alert and so on. The input unit 2062 provides a virtual keyboard on the human-machine interface for user inputting parameters therethrough.

In one embodiment, the apparatus 100 further includes a communication module 204 for transmitting/receiving parameters and instructions from servers, preferably, the communication module 204 is a wireless communication module. The managers can transmit information, such as invoice and advertisements, to display on screen. The communication module 204 includes multiple ports, for example but not limited to USB port. In one embodiment, the communication module 204 receives information and instructions from servers, such as Central Weather Bureau. When rainfall amount is greater than estimation, the detection module 104, lifting module 106 and alert module 208 will be triggered. Thus, the manager of server can not only modify randomly the default value based on the rainfall intensity, furthermore, but also modulate the lifting rate of the apparatus 100 based on the different alert water level. It should be noted that the communication module 204 also can transmit information from local to server.

In the preferred embodiment, the apparatus 100 further includes a recognition module 202, coupled to the control module 101 through the display module 206. The recognition module 202 includes but not limited to automatic non-contact recognition, such as radio frequency identification (RFID), so that the user can be recognized by certification (such as credit cards) or inputting identifier (such as ID number) to control charging procedure. In another preferred embodiment, the recognition module 202, the display module 206 and the communication module 204 can be integrated a platform (not shown in figures), so that the users can supervisor charging and transmit information via the platform.

In one embodiment, the apparatus 100 further includes a button 30 that is coupled to the overvoltage protection module 1046 and located at the surface of the apparatus 100, for example top surface or any obvious surfaces. The apparatus 100 could be lift up to a specific level by pressing the button 30 to trigger the lifting module 106. The overvoltage protection module 1046 will be triggered by pressing the button 30 to terminate charging. In one embodiment, the button 30 includes a micro switch. To phrase it another way, the charging status can be terminated by remote server automatically, or by pressing the button 30 manually.

The apparatus 100 further includes metering unit 210, coupled between the control module 101 and the overvoltage protection module 1046, calculates the usage of power generated from AC source to outside electric vehicle, then calculates fee based on the usage of power and fee-charging standard which can be modified or varied according to requirements, such as energy policy being varying from country to country.

As description above, the present invention provides a liftable charging apparatus. The liftable charging apparatus includes a control module, a power module, a detective module, an overvoltage protection module and a lifting module. The power module, coupled to the control module, includes an AC/DC converting unit for converting AC current into DC current. The detective module, coupled to the control module, includes a water level detection unit and a micro-switch. The water level detection unit is provided to detect a height of outside water level. The overvoltage protection module is coupled to the power module and the detective module. The lifting module is coupled to the control module. Wherein the overvoltage protection module is triggered by the micro-switch, thereby driving the lifting module when the height of outside water level is greater than a default value. Accordingly, the liftable charging apparatus of the present invention will be moved up and moved down more easily than prior art.

Various terms used in this disclosure should be construed broadly. For example, if an element "A" is to be coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

The foregoing descriptions are preferred embodiments of the present invention. As is understood by a person skilled in the art, the aforementioned preferred embodiments of the present invention are illustrative of the present invention rather than limiting the present invention. The present invention is intended to cover various modifications and similar arrangements included within the spirit and scope of the appended claims, the scope of which should be accorded the broadest interpretation so as to encompass all such modifications and similar structures.

What is claimed is:

1. A liftable charging apparatus with water level detection comprising:
    a control module;
    a power module, coupled to said control module, comprising:
        a AC/DC converting unit, for converting AC current into DC current;
    a detective module, coupled to said control module, comprising:
        a water level detection unit, for detecting a height of outside water level;
        a micro-switch;
    an overvoltage protection module, coupled to said power module and said detective module; and
    a lifting module, coupled to said control module;
    wherein said overvoltage protection module being triggered by said micro-switch and said lifting module being driven when said height of outside water level is greater than a default value.

2. The liftable charging apparatus with water level detection of claim 1, said power module further comprising a secondary power module and a processor.

3. The liftable charging apparatus with water level detection of claim 1, further comprising:
    a charging cable, coupled to said power module, transmits DC current to an outside electric device.

4. The liftable charging apparatus with water level detection of claim 3, further comprising:
    an alert module, coupled to said detective module through said control module.

5. The liftable charging apparatus with water level detection of claim 3, further comprising:
    a button, coupled to said overvoltage protection module.

6. The liftable charging apparatus with water level detection of claim 3, further comprising:
    a metering unit, coupled to said overvoltage protection module.

7. The liftable charging apparatus with water level detection of claim 4, wherein said alert module includes LED indicators and buzzers.

8. The liftable charging apparatus with water level detection of claim 1, wherein said lifting module being formed integrally with said detective module to being located between said apparatus and the ground.

9. The liftable charging apparatus with water level detection of claim 1, further comprising:
    a display module, coupled to said control module.

10. The liftable charging apparatus with water level detection of claim 9, further comprising:
   a recognition module, coupled to said control module through said display module.

11. The liftable charging apparatus with water level detection of claim 9, further comprising:
   a communication module, coupled to said detective module through said display module and said control module.

12. The liftable charging apparatus with water level detection of claim 1, wherein
   said recognition module including a radio frequency identification (RFID);
   said communication module including a wireless communication unit; and
   said display module including a touch screen.

13. The liftable charging apparatus with water level detection of claim 9, said display module further comprising an input unit for inputting information and instructions by users.

14. The liftable charging apparatus with water level detection of claim 1, said lifting module further comprising a rising unit and a falling unit.

15. The liftable charging apparatus with water level detection of claim 14, said rising unit and said falling unit being hydraulic machinery.

16. A liftable charging apparatus with water level detection comprising:
   a control module;
   a power module, coupled to said control module, comprising:
      a AC/DC converting unit, for converting AC current into DC current;
   a detective module, coupled to said control module, comprising:
      a water level detection unit, for detecting a height of outside water level;
      a micro-switch;
   an overvoltage protection module, coupled to said power module and said detective module; and
   a lifting module, coupled to said control module;
   a button, coupled to said overvoltage protection module; and
   an alert module, coupled to said detective module through said control module;
   wherein said lifting module being driven by said power module when pressing said button.

17. The liftable charging apparatus with water level detection of claim 16, said power module further comprising a secondary power module and a processor.

18. The liftable charging apparatus with water level detection of claim 16, further comprising:
   a charging cable, coupled to said power module, transmits DC current to an outside electric device; and
   a metering unit, coupled to said overvoltage protection module.

19. The liftable charging apparatus with water level detection of claim 16, further comprising:
   a display module, coupled to said control module;
   a recognition module, coupled to said control module through said display module; and
   a communication module, coupled to said detective module through said display module and said control module.

20. The liftable charging apparatus with water level detection of claim 16, said lifting module further comprising a rising unit and a falling unit, wherein said rising unit and said falling unit being hydraulic machinery.

* * * * *